Aug. 30, 1932.  C. A. BROWN ET AL  1,874,168
GLASS FORMING MACHINE
Filed July 8, 1927   6 Sheets-Sheet 1
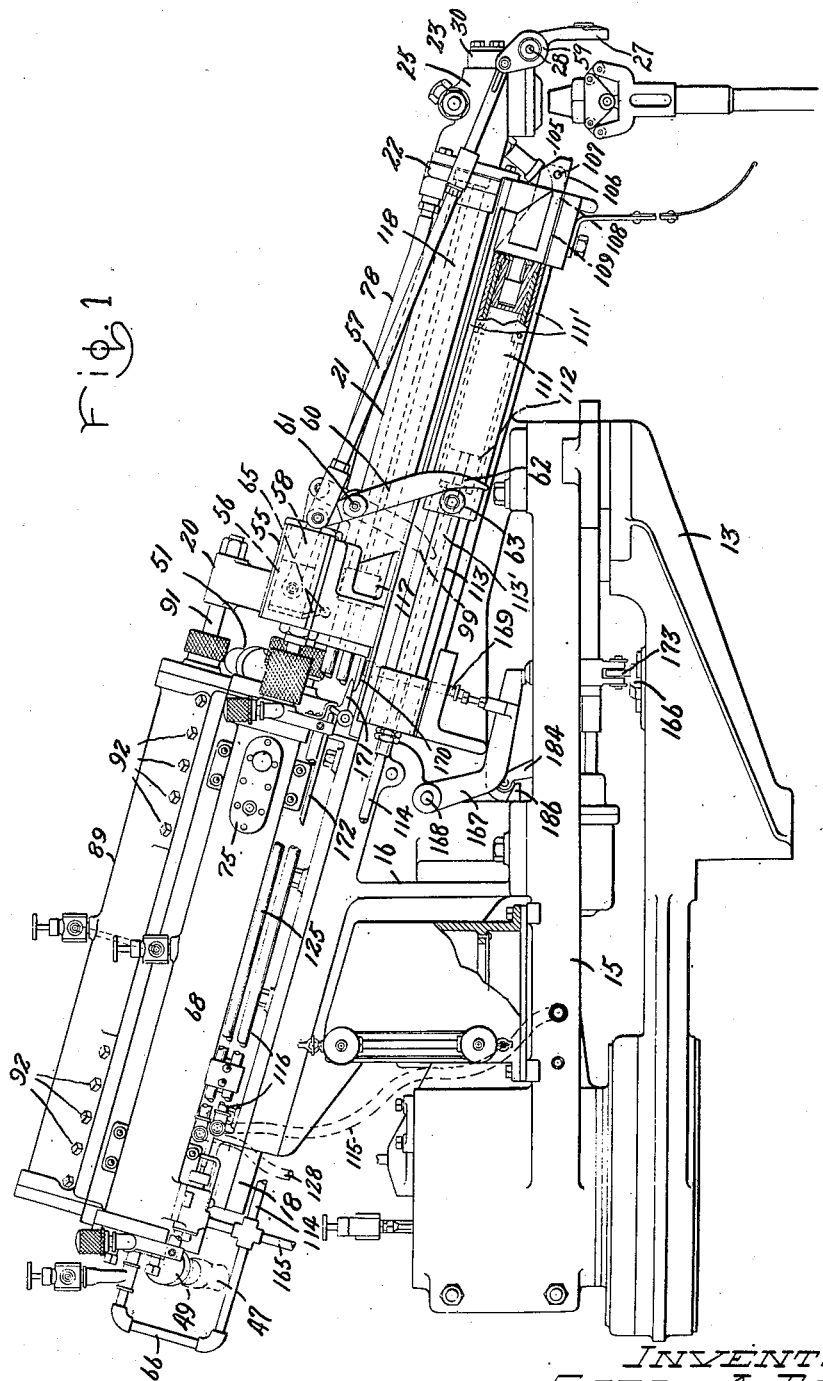
INVENTORS:
CARL A. BROWN,
FRANK B. VAN SICKLE,
CHARLES W. CRAIG,
BY
THEIR ATTORNEY.

Aug. 30, 1932.   C. A. BROWN ET AL   1,874,168
GLASS FORMING MACHINE
Filed July 8, 1927   6 Sheets-Sheet 2
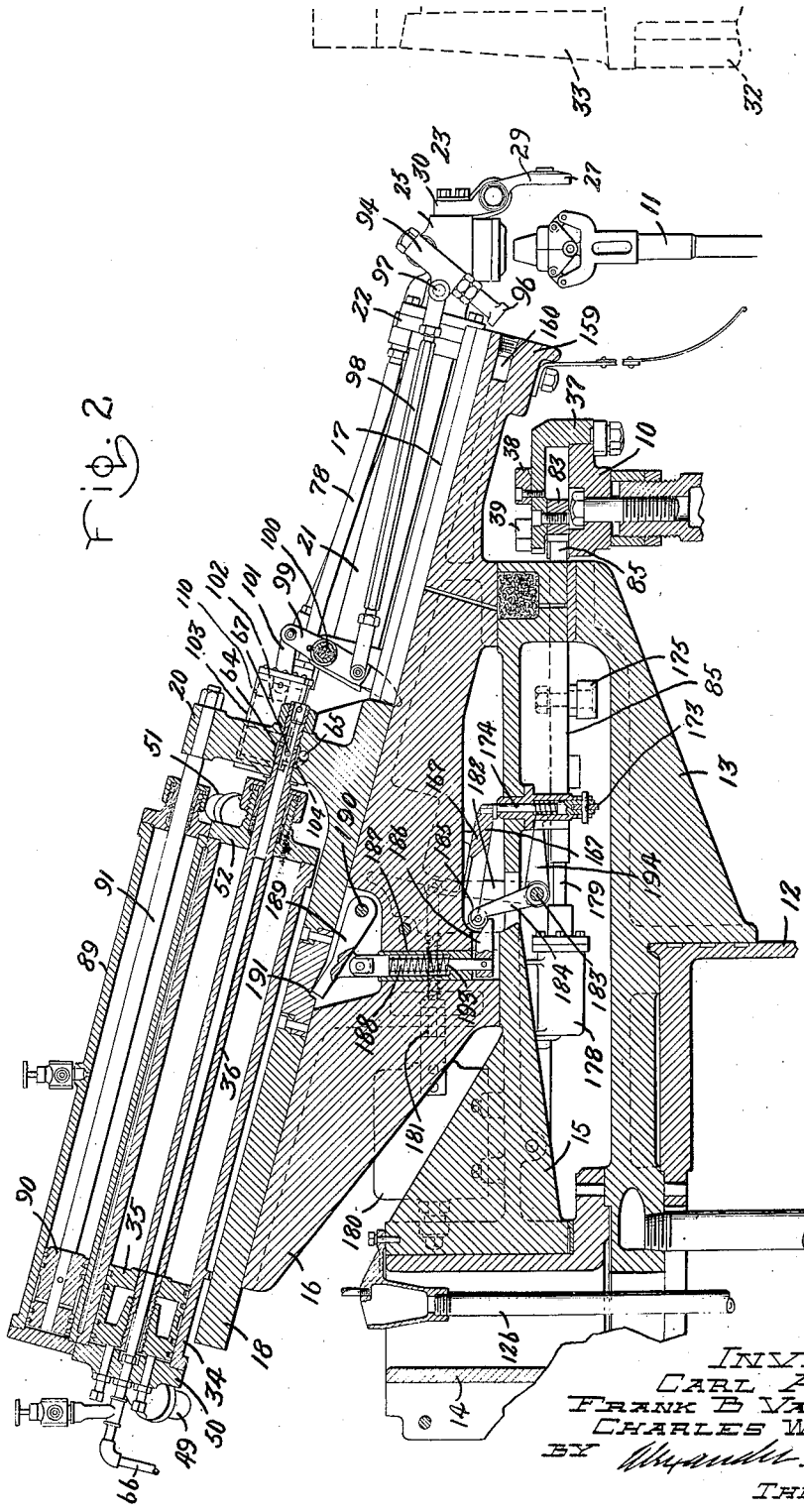
INVENTORS:
CARL A. BROWN,
FRANK B VAN SICKLE,
CHARLES W CRAIG,
BY
THEIR ATTORNEY

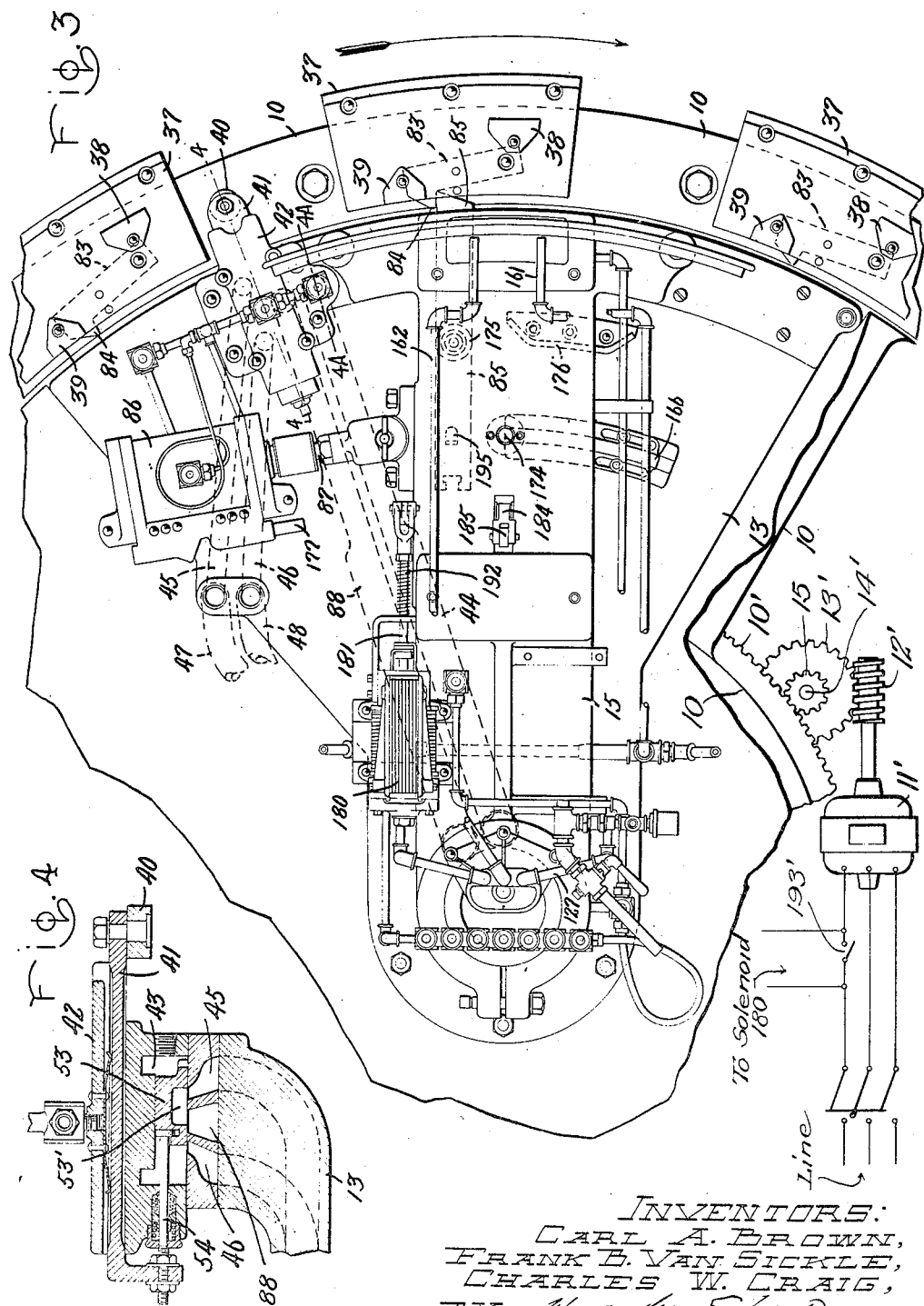

Aug. 30, 1932.   C. A. BROWN ET AL   1,874,168
GLASS FORMING MACHINE
Filed July 8, 1927   6 Sheets-Sheet 4
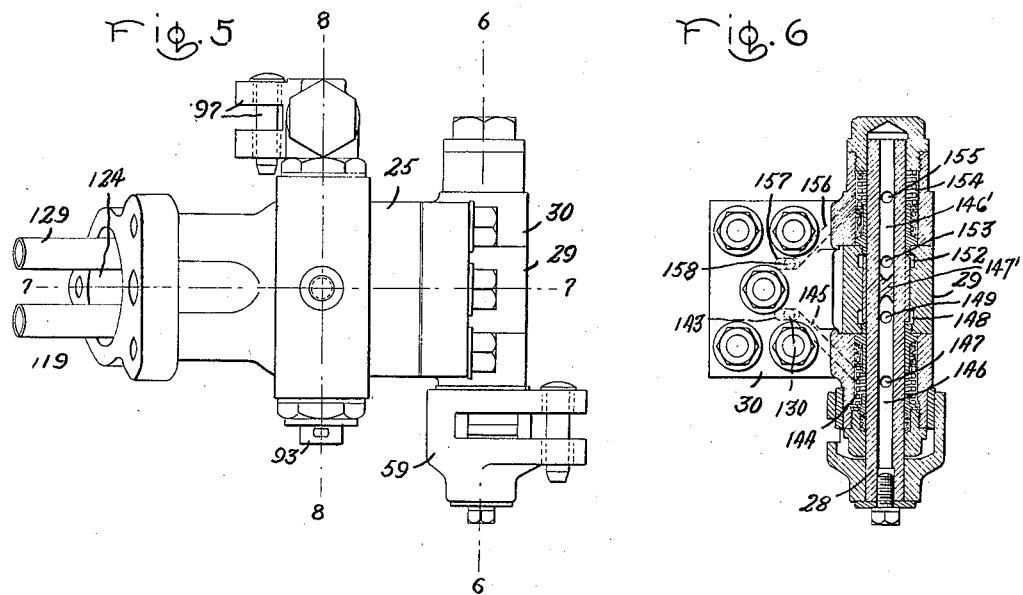
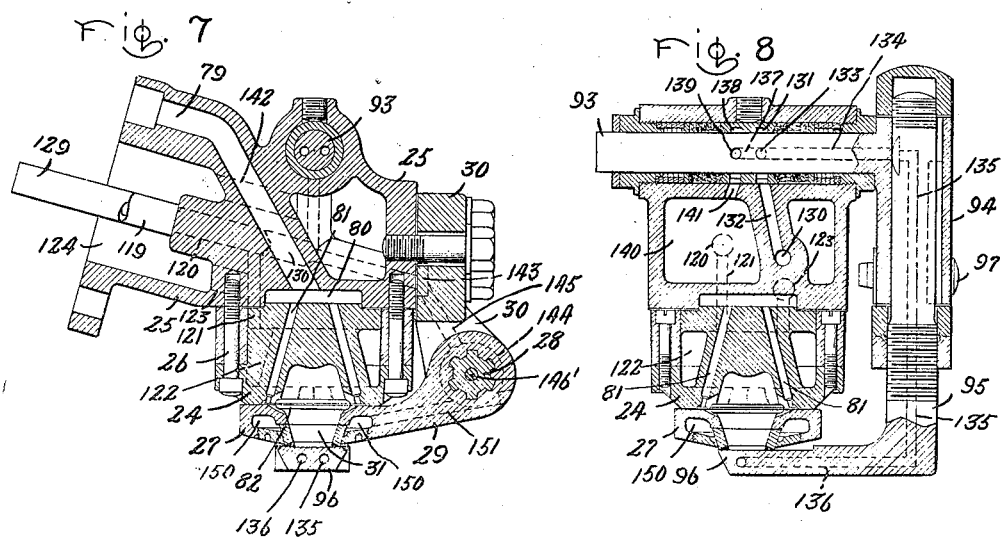
INVENTORS:
CARL A. BROWN,
FRANK B. VAN SICKLE,
CHARLES W. CRAIG,
BY
THEIR ATTORNEY.

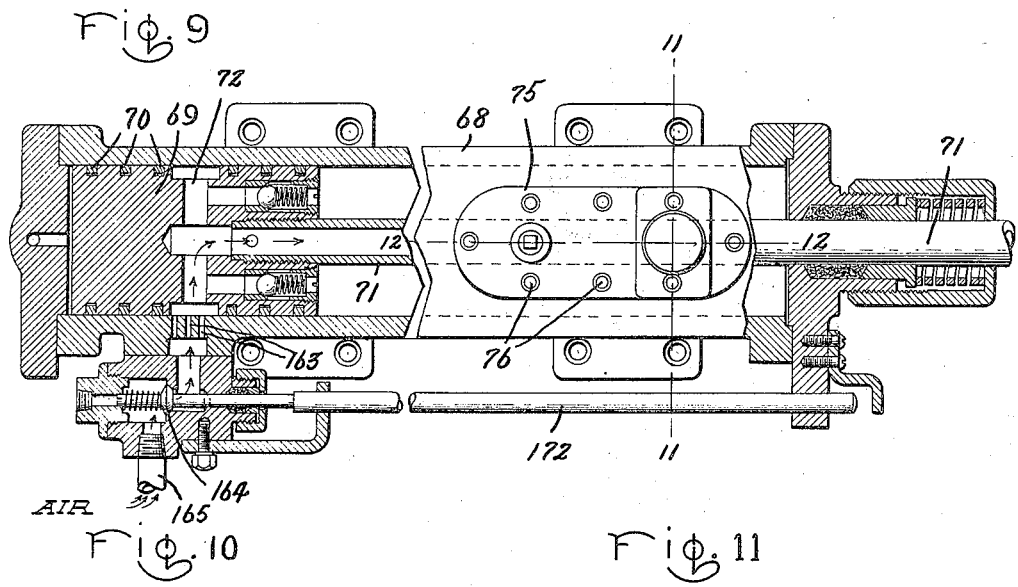
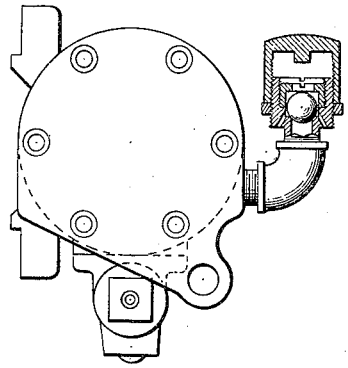
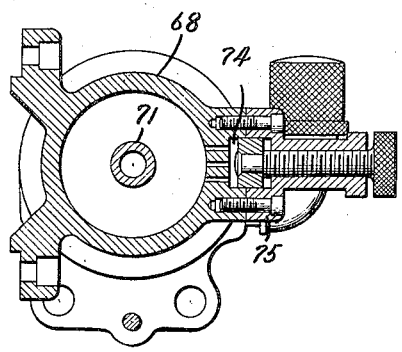
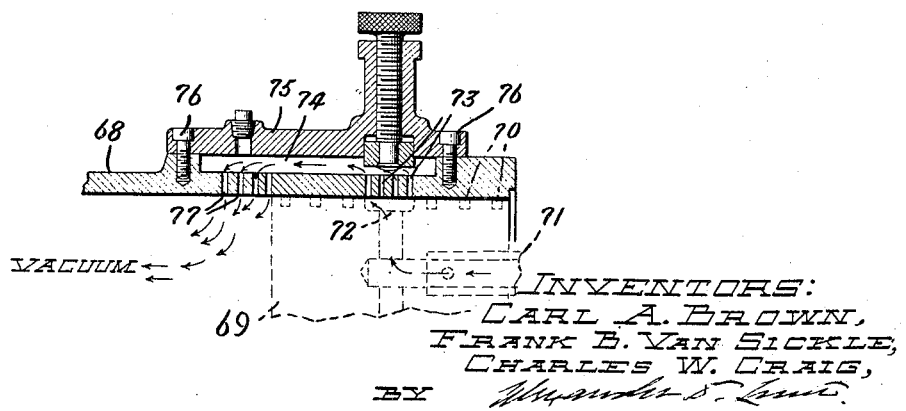

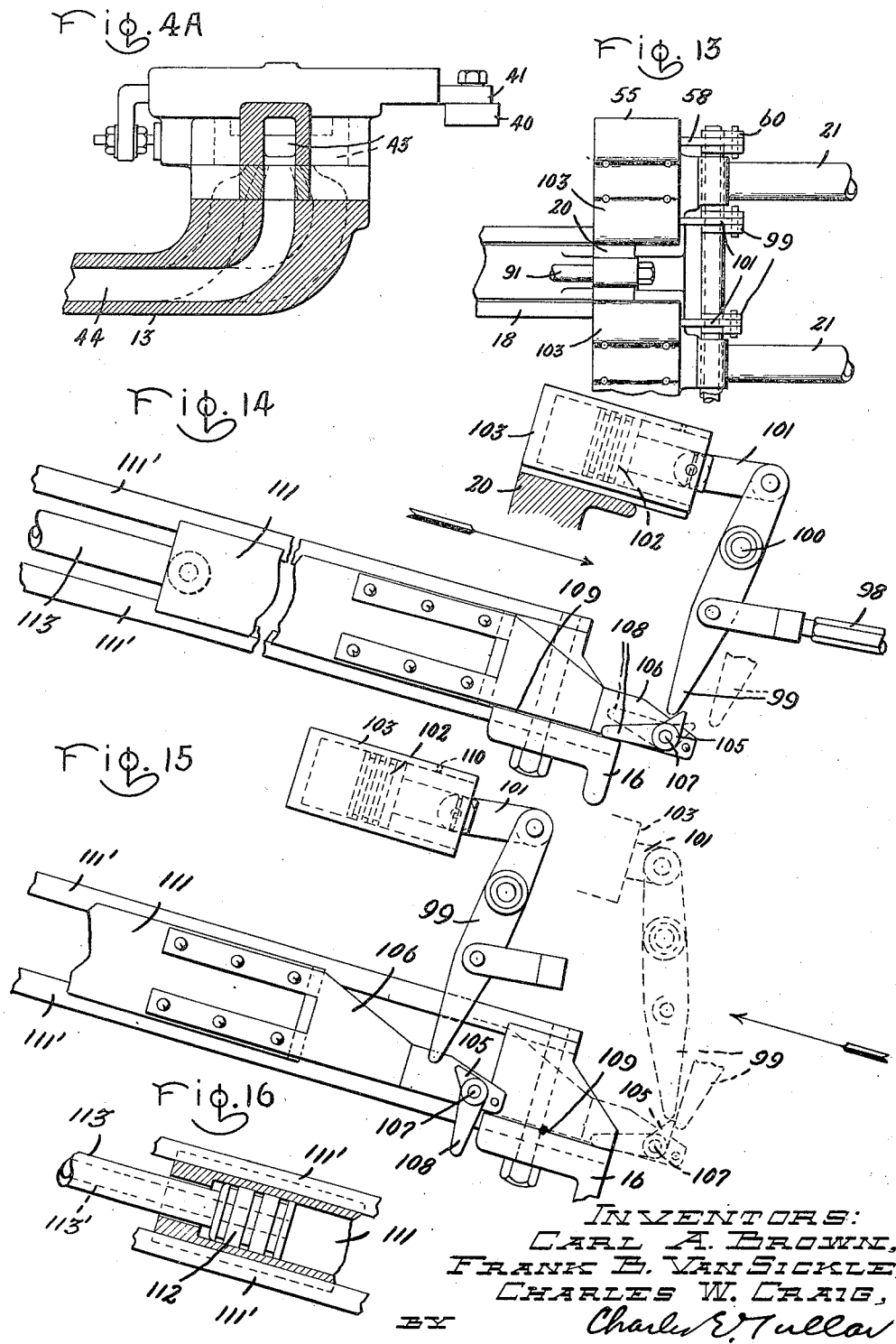

Patented Aug. 30, 1932

1,874,168

UNITED STATES PATENT OFFICE

CARL A. BROWN, OF EAST CLEVELAND, FRANK B. VAN SICKLE, OF WICKLIFFE, AND CHARLES W. CRAIG, OF EAST CLEVELAND, OHIO, ASSIGNORS TO GENERAL ELECTRIC COMPANY, A CORPORATION OF NEW YORK

GLASS FORMING MACHINE

Application filed July 8, 1927. Serial No. 204,378.

Our invention relates to machinery for manufacturing glassware and more particularly to machinery for gathering blanks from a source of molten glass such as a tank, and for delivering them to apparatus for shaping them into finished articles. Still more particularly our invention relates to machinery comprising means for gathering the glass blanks by suction. We have embodied our invention specifically in a machine of the character of that disclosed in certain patents to Kadow, for example, 1,527,556, February 24, 1925, and 1,251,671, January 1, 1918. The machine disclosed in the latter comprises a ram which is projected into a glass furnace at regular intervals and delivers the blanks to a series of glass forming units. Our invention has particularly to do with the improvements in the cooling of the parts which are subjected to great heat, to improved means for operating the gathering ram and for cushioning the same in its movements so as to reduce shock and vibration and to thus render the machine more durable. Our invention also comprises improvements in the means for producing the vacuum for gathering and for insuring that the ram assumes a retracted position during the cessation of movement of the machine so as to prevent the destruction of the parts which would otherwise be left in the region of high temperature. Still another feature of our invention is the provision of pneumatic means for assisting in the discharge of the gathering blank. Various other features and advantages of our invention will appear from the detailed description of a species thereof which follows and from the accompanying drawings.

In the drawings, Fig. 1 is a side elevation of our improved apparatus; Fig. 2 is a sectional elevation thereof; Fig. 3 is a fragmentary plan view of a glass forming machine illustrating such parts of the machine as are necessary for the understanding of our invention; Fig. 4 is a sectional detail along the line 4—4 of Fig. 3; Fig. 4A is a section along the line 4A—4A of Fig. 3; Fig. 5 is a plan view of one of the blank molds used in connection with our apparatus; Fig. 6 is a section along the line 6—6 of Fig. 5; Fig. 7 is an elevation in section along the line 7—7 of Fig. 5; Fig. 8 is a section along the line 8—8 of Fig. 5; Fig. 9 is a fragmentary plan view partially in section of the vacuum cylinder; Fig. 10 is an end view thereof; Fig. 11 is a section along the line 11—11 of Fig. 9; Fig. 12 is an enlarged fragmentary section along the line 12—12 of Fig. 9; Fig. 13 is a fragmentary plan view of the ram slide and associated mechanisms carried thereby; Fig. 14 is a fragmentary elevation of the knife operating mechanism during the forward travel of the ram; Fig. 15 is a similar view during the return of the ram; and Fig. 16 is a fragmentary section through the knife cam operating cylinder.

We have shown our invention used in connection with a glass forming machine such as the type disclosed in the Kadow Patent 1,527,556 above referred to. This machine has been in general use for some time and its construction and operation are known to those skilled in the art. Therefore, it will be sufficient to illustrate and describe such parts only of the apparatus as have a direct bearing upon our invention.

The machine herein shown comprises a rotating structure which supports a plurality of glass forming elements, in radial arrangement with reference to the axis of rotation of said structure, which are adapted to receive and operate upon the blanks successively gathered and formed by a single gathering mechanism which reciprocates radially of the machine in and out of the working opening of the furnace and is then rotated for a short distance with the rotating structure in order that the blanks so gathered may be accurately delivered. The gathering mechanism or ram, is preferably provided with two gathering molds which gather and form the blanks and deliver them in pairs to the glass forming elements. Each set of glass forming mechanism comprises a pair of spindles which receive the blanks and form them simultaneously into finished articles by a series of operations which, so far as our invention is concerned, do not require description.

The gathering operation is performed by vacuum which is created by the reciprocation of the ram and automatically controlled by associated mechanism. The reciprocating movements of the ram are affected by compressed air controlled through a valve which is automatically operated by a series of cams carried on the rotating structure of the machine. Those portions of the ram including the mold sections and shearing blades which are subjected to heat from the furnace are kept constantly cooled by water which is caused to flow continuously through various passages and chambers formed in these elements.

Referring now to the drawings, (Figs. 1, 2 and 3), the rotating structure supporting the glass forming mechanism is shown at 10. The said structure carries gear 10′ and is rotated by motor 11′ through worm 12′, worm gear 13′, shaft 14′ and gear 15′ diagrammatically shown in Fig. 3. 11 is one of the pair of spindles forming part of these glass forming mechanisms. 12 is the central stationary column upon which is mounted the bracket 13. Extending upwardly from the said bracket is the hollow shaft 14 which has rotatably mounted thereon a swinging bracket 15 which carries the ram carriage 16. The upper surface of this carriage has a downward inclination, outwardly of the machine, and is formed with slotted guideways 17 for the ram 18, the lower portion of which forms a slide adapted to fit said guideway. The ram terminates at its outer end in a cross head 20. Attached to the said cross head and extending outwardly therefrom are a pair of tubular members 21 carrying at their outer ends a pair of ram snouts 22 which have attached thereto the gathering mechanism comprising in part the molds 23, one of which appears in Fig. 1 and the other in Fig. 2.

The molds are preferably identical in construction and the mechanism for opening and closing them and for shearing off the surplus glass are alike so that it will be sufficient to describe one of these molds and the mechanism associated therewith. As shown in Figs. 1, 2, 5, 6, 7 and 8, the mold comprises an upper mold section 24 secured to a head 25 through bolts 26, the head in turn being bolted to the ram snout 22. The lower mold section 27 is mounted on a shaft 28 through an arm 29. The shaft 28 is rotatably mounted on a bracket 30 which is bolted to the head 25. The lower mold section has an opening 31 through which the molten glass is gathered when the mold is in operative relation with a pot of molten glass in the furnace 32 located adjacent to the forming machine.

The ram 18, with its gathering molds, is thrust into and withdrawn from the furnace 32 through the opening 33 by means of compressed air supplied from an outside source (not shown) to a cylinder 34 (Fig. 2) mounted upon the ram carriage 16. Slidably mounted in the said cylinder is a piston 35 which is connected to the cross head 20 of the ram 18 through a hollow piston rod 36. The movements of the ram are controlled by the rotating structure 10 which has mounted upon its upper ring a plurality of blocks 37 (Fig. 3) each of which carry a pair of cams 38 and 39. These cams are adapted to successively engage a roller 40 secured to the outer end of a slidable arm 41 forming part of a valve 42 mounted upon the bracket 13. Air under pressure is delivered to the chamber 43 of the valve 42 (Fig. 4) through a passage 44 formed in the bracket 13. Passages 45—46 are also formed in bracket 13 and arranged to communicate with air cylinder 34 through sections of flexible tubing 47 and 48. The tubing 47 (Fig. 1) is coupled with a pipe 49 forming part of the back cover plate 50 of the cylinder and having a passage communicating wth the inside of the said cylinder. The tubing 48 is coupled with a similar pipe 51 forming part of the front cover plate 52 which also has a passage communicating with the said cylinder.

During the rotation of the structure 10, the glass forming mechanism comprising the spindles 11 are brought successively in pairs in front of the working opening 33 of the furnace. As each pair of spindles approaches this working opening, the cam 38 engages roller 40, the shape of the cam being such as to force the said roller and its arm 41 backward, the said arm in turn carrying a valve block 53 backward through the attached rod 54. The block 53 is slidably mounted in the chamber 43 and upon its backward movement uncovers the passage 45 thereby allowing air under pressure contained in the chamber 43 to pass to the rear end of the ram cylinder 34 by way of the flexible tubing 47 thus causing the ram to be thrust forwardly and downwardly into the furnace 32 at which time the lower neck mold sections 27 are caused to close upon the upper mold sections 24 so that when the ram is in its extended position the molten glass may be sucked by vacuum through the openings 31 up into the mold cavities.

The mechanism for opening and closing the neck molds 27 comprises a pair of cylinders 55 preferably identical in construction and mounted on opposite sides of the ram cross head 20 one of which is shown in Fig. 1, and a description of one will be sufficient. Slidably mounted in the cylinder 55 is a piston 56 which is pivotally connected to an operating rod 57 through its piston rod 58. The operating rod 57 is connected to the neck mold 27 through an arm 59 attached to the end of shaft 28. A lever 60 pivotally mounted on the operating rod 57 and fulcrumed at 61 holds the neck mold open by reason of its lower end 62 engaging a stop roller 63. Upon the forward movement of the ram the lower end 62 of the lever moves away from the stop 63 and the piston 56 moves outwardly forcing the operating rod outwardly and so closing the mold. The mold is held in closed position by compressed air which is being continuously supplied to the cylinder in the rear of the piston 56 from a chamber 64 which communicates with passages 65 formed in the cross head 20. The chamber 64 receives its air from an outside source through a pipe 66 which directs air into hollow piston rod 36 having an opening 67 communicating with chamber 64. The opening of the neck mold is accomplished during the withdrawal of the ram at which time the lower end 62 of the lever strikes against the stop 63, thus slightly rotating the lever about its fulcrum 61 so that the upper end of the lever forces the piston backward under pressure and in addition withdrawing the operating rod 57 which in turn opens the mold as shown in Fig. 1. The vacuum used for gathering the glass from the furnace is created in a pair of vacuum cylinders 68 (Fig. 1) mounted upon the ram carriage 16 on opposite sides of the ram cylinder 34. These cylinders being identical in construction and operation, a description of one will be sufficient. As shown in Figs. 9 to 12 inclusive, the cylinder 68 has slidably mounted therein a piston 69 having the usual piston rings 70. The piston is connected to the ram cross head 20 through its hollow piston rod 71. Upon the forward movement of the ram 18, the piston 69 is drawn outwardly thereby creating vacuum in the cylinder 68 behind the said piston. When the ram 18 has reached the end of its forward movement the piston 69 is in the position shown in Fig. 12. When in this position a passage 72 formed in the said piston is caused to register with a series of slots 73 formed in the cylinder 68. The slots 73 communicate with a by-pass or chamber 74 formed by a recessed portion of the cylinder and a cover plate 75 secured to the cylinder by bolts 76. The chamber 74 communicates with the cylinder in the rear of the piston when the said piston is at the end of its forward stroke by means of a similar series of slots 77. The vacuum thus created enters the hollow piston rod 71, and its path is to the ram cross head 20 which has a passage therein arranged to communicate with a pipe 78 said pipe being attached at one end to the ram cross head and having its opposite end attached to the ram snout 22 (Fig. 1). A suitable passage formed in the said snout communicates with passage 79 formed in the mold head 25. As shown in Fig. 7 the passage 79 terminates in a chamber 80 and through passages 81 communicates with a circular slot 82 formed at the junction of the blank and neck mold sections, with the result that the molten glass is drawn into and fills the cavity formed by the said blank and neck mold. During this time the ram carriage 15 is caused to rotate so that when the ram is withdrawn from the furnace, the molds carried thereby will be accurately aligned with a pair of continuously moving spindles 11 which are to receive the blanks from the said molds.

The radial movement of the ram carriage is accomplished by the rotating structure 10 which, as shown in Fig. 3, has mounted upon its top ring a plurality of dogs 83, and as shown in Figs. 2 and 3, one of these dogs is placed underneath each of the blocks 37. The position of each dog on the rotating structure is such as to allow the ram sufficient time to be projected within the furnace whereupon the nose 84 of the said dog engages a flat bar 85 slidably mounted on the underside of the ram carriage 15, thus rotating the carriage against the action of an air cylinder 86 mounted on the bracket 13. A piston slidably mounted in the cylinder is connected to the ram carriage through the piston rod 87. In due time one of the cams 39, hereinbefore referred to, engages the rear side of the roller 40 causing the arm 41 to be drawn outwardly which in turn moves the valve block 53. As the block 53 moves forward, it establishes communication between the compressed air chamber 43 and the passage 46 (Fig. 4) thus allowing compressed air to flow through said passage to the front inside end of the ram cylinder 34 through flexible tubing 48 and pipe 51. As the air enters the front end of the cylinder 34, it forces the piston backwardly, thereby withdrawing the ram from the working opening of the furnace. Accumulated air in the cylinder is allowed to escape through a by-pass 53' formed in the valve block 53. This by-pass connects with the atmosphere through passage 88 formed in the bracket 13. The ram is cushioned upon its backward and forward movements by means of cushioning cylinder 89 (Figs. 1 and 2) having slidably mounted therein a piston 90 connected to ram cross head 20 through its piston rod 91. Pressure within the cylinder 89 is relieved by a series of adjustable vent cocks 92.

During the withdrawal of the ram the surplus glass is sheared off from the gathering openings of the molds by a pair of similarly operated knives only one of which will be described. Rotatably mounted in mold head 25 is a shaft 93 carrying at its outer end a hollow depending arm 94 (Fig. 8) adapted to receive and securely hold therein an arm 95 whose lower L shaped portion comprises a shearing blade 96. The arm 94 is pivotally connected through a fork and pin 97 (Fig. 2) to a rod 98 whose opposite end is pivotally attached to a lever 99. This lever is fulcrumed at 100 and is pivotally attached at its upper end to the end of a piston rod 101 which extends from a piston 102 slidably mounted in a cylinder 103. The blade 96 is normally held in the position shown in Fig. 2 by means of the air cylinder 103 whose piston is constantly under pressure by air supplied to said cylinder in the rear of the piston, through passage 104 which communicates with chamber 64 hereinbefore referred to through passage 65. During the forward movement of the ram the lever 99 strikes a trip cam 105 (Fig. 14) which is mounted upon a support 106 so as to rotate about its pivot 107 and allow the said lever to pass over it. However, as the lever strikes the cam 105 on the backward movement of the ram, the cam is held stationary by its extension 108 resting on the track 109 formed on the end of the carriage 16. The lower end of the lever is then forced outward in turn forcing the shearing blade over the face of the neck mold through the operating rod 98, as shown in dotted lines in Fig. 15. The forcing of the lever outward rotates it about its fulcrum 100 until the lower end thereof clears the trip cam 105 whereupon the piston which has been forced back under pressure immediately goes forward and through its piston rod forces the upper end of the lever outwardly so as to return the shearing blade to its normal position. A relief port 110 formed in the cylinder regulates the speed of the piston so as to cushion the blade upon its return movement. As a safety factor we have mounted the trip cam 105 and its support 106 upon a cylinder 111, Figs. 1, 14, 15 and 16. The cylinder 111 is slidably mounted on the bars 111' and adapted to ride over a stationary piston 112 which extends therein. The cylinder is normally held in the position shown in Figs. 1 and 15 by compressed air directed to the inside thereof by a pipe 114 which communicates with a passage 113' formed in the rod 113. In case the shearing blade is prevented from passing over the face of the neck mold due to an obstruction such as a partial closing of the said neck mold, the end of the lever 99 on the backward stroke of the ram 18 contacts with the trip cam 105. The force of the ram is great enough to overcome the pressure in the cylinder 111 whereupon the said cylinder moves backwardly carrying with it the trip cam 105 to a point where its extension 108 may drop off the end of the track 109 thereby allowing the lever to free itself and return the shearing blade to its normal position as shown in Fig. 15. The cylinder 111 is again returned to its normal position.

The various portions of our improved gathering mechanism, such as the mold sections, shearing blades and those portions of the ram carriage adjacent to the furnace are kept constantly cooled by water which is continuously supplied through a series of pipes to passages formed in the various elements. The path of the water for cooling the mold sections and shearing blades is from an outside source through flexible tubing 115 into metal pipe 116, said pipe being attached to and movable with the ram 18. From the pipe 116 the water is directed into a divided plug 117 located in the ram cross head 20 (Fig. 1). From the plug a portion of the water flows through pipe 118 located in the tubular member 21 to a pipe 119 which connects with passage 120 located in the mold head 25 (Fig. 7). A passage 121 connects the passage 120 with a circular chamber 122 formed in the upper mold 24. The water circulates around the chamber 122 to an outlet passage 123 where it is directed to an outlet chamber 124 formed in the mold head 25. From this chamber the water is caused to flow back through the tubular member 21 and out through drain pipe 125 attached to the ram 18, the water eventually reaching the main drain pipe 126 (Fig. 2) through pipe 127 (Fig. 3). The pipe 127 is connected to metal pipe 125 through flexible tubing 128. The path of the water for cooling the neck mold 27 and the shearing blade 96 is from the divided plug 117 down through a pipe located in the tubular member 21 and connected to pipe 129 which communicates with a passage 130 formed in the mold head 25. For cooling the shearing blade 96, the passage 130 communicates with a chamber 131 through passage 132 (Fig. 8). Water from the chamber 131 passes to the shearing blade 96 through an opening 133 formed in the shaft 93, said opening communicating with a passage 134 which connects with passage 135 formed in the shearing arm 95. The passage 135 carries the water to the end of the shearing blade 96, the said passage being U shaped at this point so as to carry the water back through a similar passage 136 in the arm 95. The passage 136 communicates with passage 137 formed in the shaft 93, said passage communicating with chamber 138 through opening 139. From the chamber 138 the water flows to a chamber 140 through passage 141. The water after passing through the chamber 140 flows through passage 142 to the outlet chamber 124 where it is directed to the drain as previously described.

The cooling of the neck mold is accomplished by directing a flow of water from the passage 130 to a chamber 143 formed in the bracket 30 (Figs. 6 and 7). The chamber 143 communicates with a chamber 144 surrounding the shaft 28 through passage 145 and water is directed to a central passage 146 formed in the said shaft through an opening 147. Central passage 146 communicates with chamber 148 through passage 149 and chamber 148 communicates with neck mold chamber 150 (Fig. 8) through passage 151. The water circulates around the chamber and out through a passage similar to and parallel with passage 151 to chamber 152 where it enters through the opening 153 the central passage 146' which is in alignment with the passage 146 but separated therefrom by partition 147'. The water now passes down the central passage to chamber 154 through opening 155 and from this chamber the water is directed through passage 156 to chamber 157 formed in the bracket 30. From chamber 157 the water flows through passage 158 to chamber 140 and then as before to drain chamber 124 through passage 142.

The nose 159 of the ram carriage (Fig. 2) is cooled by water directed into the chamber 160 through inlet pipe 161 and then carried off to the main drain through outlet pipe 162 (Fig. 3).

Before delivering the blanks from the blank molds to the spindles, the molds are caused to follow the spindles a short distance. During this time the vacuum passage 72 has been moved out of register with the slots 73 by the backward movement of the piston 69 caused by the withdrawal of the ram. This automatically closes the vacuum line. As the piston 69 reaches the end of its backward stroke, the passage 72 is caused to register with a series of slots 163 (Fig. 9) formed in the cylinder 68. The delivery of the blanks to the spindles takes place when a valve 164 is automatically opened thereby allowing a puff of compressed air from the air line 165 to be admitted to the passage 72 through the slots 163. The air travels through the vacuum line passages hereinbefore described so as to facilitate the removal of the blanks from the molds. The mechanism for operating the valve 164 comprises a stationary cam 166 mounted upon the bracket 13 (Figs. 1 and 3). An arm 167 pivotally mounted at 168 on the ram carriage 16 operates a spring pressed plunger 169. When the ram is in its retracted position, a wedge 170 slidably mounted in the cross head 20 is caused to rest upon the plunger 169. Resting upon the wedge 170 is one arm of a crank 171, the opposite arm of said crank abutting the end of valve stem 172. The shape of the cam 166 is such as to raise at the proper time the arm 167 through the roller 173 and arm 174 (Fig. 2).

This causes the plunger 169 to raise and carry with it the wedge 170 which in turn rotates the crank so that its opposite arm pushes backwardly the valve stem 172 thereby opening the valve 164.

After the delivery of the blanks to the spindles, a roller 175 (Figs. 2 and 3) mounted on the underside of the bar 85 engages a cam 176 mounted on the stationary bracket 13. The shape of the cam is such as to force the bar inwardly and out of engagement with the dog 83 whereupon the ram carriage bracket is pulled back to its normal position by means of compressed air which is being continuously admitted to the swing cylinder 86 through pipe 177 (Fig. 3). The bar 85 is immediately pushed forward to its normal position through an air cylinder 178 whose piston is connected to the bar 85 through the piston rod 179 (Fig. 2).

The reciprocation and rotation of the ram may be halted at any time without interrupting the movements of the rotating structure 10 by an electrically operated mechanism comprising a solenoid 180 (Figs. 2 and 3). A plunger 181 operated by the said solenoid has attached to its opposite end a lever 182 fastened on shaft 183. Fastened to the opposite end of said shaft is the lever 184 whose upper end carries a roller 185 which rests upon the tapered surface of a plate 186. Extending upwardly from the plate 186 and slidably mounted in bearing 187 is a push rod 188 which is attached at its upper end to a locking lever 189. The locking lever is pivotally mounted at 190 and is adapted to engage a slot 191 formed on the under side of the ram 18. Normally when the machine is in operation the solenoid 180 is energized by current supplied to it from the main power line which also supplies current for the operation of the rotating structure 10. As the solenoid becomes energized it withdraws the plunger 181 against the action of a coiled spring 192. This movement of the plunger carries the lever 182 inwardly which through shaft 183 rotates the lever 184 so that its roller 185 rides upon the tapered face of the plate 186 so as to pull down the push rod 188 against the action of the coiled spring 193 thereby removing the end of the locking lever 189 from the slot 191.

In case trouble develops in the main power line or the current supply should accidentally be turned off so as to stop rotation of the machine, the solenoid 180 which is tapped into the operating circuit would immediately be deenergized allowing the coiled spring 192 to force the plunger 181 outwardly, the said plunger through lever 182, shaft 183, lever 184 would relieve the pressure of roller 185 against the plate 186 thus allowing coiled spring 193 to force push rod 188 and its locking lever upwardly against the underside surface of the ram 18. As the ram returns from the furnace the slot 191 on the underside thereof being of the proper design passes over the locking lever which, being spring pressed, forces its end into the said slot so as to prevent the return of the said ram to the furnace, as clearly shown in Fig. 2. The rotation of the carrier will always continue for a certain time after the shutting off of the power and this will cause sufficient reciprocation of the ram to insure the locking thereof.

It may be desirable at times to stop reciprocation of the ram but allow the rotating structure 10 to continue operations until all of the spindles 11 have disposed of their blanks. In this event an operator simply throws a switch 193' cutting off the current supply to the solenoid without affecting the operation of the machine in general. The swinging or partial rotation of the ram carriage bracket is also prevented at this time by a lever 194 (Fig. 2) fastened to shaft 183 and adapted to engage a slot 195 (Fig. 3) formed in the bar 85 as the said bar is moved inwardly by the action of cam 176 acting upon roller 175. The lever 194 holds the bar 85 inwardly and out of the path of the index dogs 83.

What we claim as new and desire to secure by Letters Patent of the United States is:—

1. In a machine for gathering glass blanks and forming them into articles, the combination of a blank gathering mold, a movable support therefor, means for reciprocating said support toward and from a source of molten glass, means for producing a vacuum for said gathering mold comprising a cylinder and a piston connected with and movable by said reciprocating means, means for introducing a puff through said passage to discharge the blank and means whereby said parts are caused to operate in proper sequence.

2. In a machine for gathering glass blanks and forming them into articles, the combination of a blank gathering mold, a travelling carrier having blank shaping devices mounted thereon, a ram supporting said mold, means for reciprocating said ram toward and from a source of molten glass, means for driving said carrier, means whereby the operation of said ram is properly timed with the movement of said carrier to deliver blanks from said mold to said shaping devices and automatic means for locking said ram in a retracted position upon the failure of the driving means for said carrier including a device actuated as a result of the failure of the source of supply of power of the driving means for said carrier.

3. In a machine for gathering glass blanks and forming them into articles, the combination of a blank gathering mold, an electrically driven travelling carrier having blank shaping devices mounted thereon, a ram supporting said mold, means for reciprocating said ram toward and from a source of molten glass, means whereby the operation of said ram is properly timed with the movement of said carrier to deliver blanks from said mold to said shaping devices, and means including a device actuated as a result of failure in the electric circuit of the carrier drive for insuring that the ram thereupon assumes a retracted position.

4. In a machine for gathering glass blanks from a furnace, the combination of a mold comprising a stationary upper section, a shaft, and a lower section rotatably mounted on said shaft, means for reciprocating said mold as a whole into and out of an opening in said furnace, means for closing said lower section when said mold is in said furnace and for causing it to open after withdrawal of said mold from said furnace, both of said sections and said shaft being provided with passages for cooling liquid and means for circulating said liquid through said passages.

5. In a machine for gathering glass blanks from a furnace, the combination of a mold comprising a stationary upper section, a shaft, and a lower section rotatably mounted on said shaft, means for reciprocating said mold as a whole into and out of an opening in said furnace, means for closing said lower section when said mold is in said furnace and for causing it to open after withdrawal of said mold from said furnace, both of said sections and said shaft being provided with passages for cooling liquid inter-connected so that they form a continuous cooling liquid circulation system and means for causing liquid to circulate through said system.

6. In a machine for gathering glass blanks from a furnace, the combination of an assembly comprising an upper mold section, a shaft, a lower mold section rotatably mounted on said shaft, another shaft and a shearing member rotatably mounted on said shaft, means for reciprocating said assembly into and out of an opening in said furnace, means for closing said lower mold section and for moving said shearing member across the mouth of said lower mold section when said assembly is in said furnace and for opening said mold section and displacing said shearing member after said assembly has been withdrawn from said furnace, both of said mold sections, said shafts and said shearing member being provided with intercommunicating passages for cooling liquid and means for circulating said liquid through said passages.

7. In a machine for gathering glass blanks from a furnace, the combination with a ram, a mold carried by said ram, a shearing blade pivotally mounted adjacent said mold, means for reciprocating said ram to and from an opening in said furnace, operating connections for rotating said shearing blade across an opening in said mold comprising a lever, a stop positioned to engage said lever at a point in its travel to actuate said blade and yielding means for supporting said stop adapted to allow said lever to clear said stop upon obstruction of said shearing blade.

8. In a machine for gathering glass blanks from a furnace, the combination with a ram, a mold carried by said ram, a shearing blade pivotally mounted adjacent said mold, means for reciprocating said ram to and from an opening in said furnace, operating connections for rotating said shearing blade across an opening in said mold comprising a lever, a stop pivotally mounted and positioned to engage said lever at a point in its travel to actuate said blade, a track positioned to prevent the turning of said stop in one direction and a yielding supporting means for said stop constructed to allow said stop to be forced back by said lever upon obstruction of said blade until said stop clears said track and means for thereafter returning said stop to its former position.

9. In a machine for gathering glass blanks from a furnace, the combination with a ram, a mold carried by said ram, a shearing blade pivotally mounted adjacent said mold, means for reciprocating said ram to and from an opening in said furnace, operating connections for rotating said shearing blade across an opening in said mold comprising a lever, a stop pivotally mounted and positioned to engage said lever at a point in its travel to actuate said blade, a track positioned to prevent the turning of said stop in one direction and a yielding supporting means for said stop comprising a piston, a cylinder and connections to said stop and means for supplying air to said cylinder to return said stop to its normal position after being forced back by said lever.

10. In a machine for gathering glass blanks and forming them into articles, the combination of a blank gathering mold, an electrically driven travelling carrier having blank shaping devices mounted thereon, a ram supporting said mold, means for reciprocating said ram toward and from a source of molten glass, means whereby the operation of said ram is properly timed with the movement of said carrier to deliver blanks from said mold to said shaping devices, and means, for insuring that the ram assumes a retracted position upon failure in the electric circuit of the carrier drive, comprising a solenoid and a movable locking lever controlled thereby, said ram being slotted to receive said locking lever upon actuation thereof.

11. In a machine for gathering blanks from a furnace, the combination of a rotatable carrier supporting a series of blowing spindles, a ram supporting a blank gathering mold, means for rotating said carrier to present said spindles successively to said ram, means for reciprocating said ram to cause said gathering mold to enter an opening in said furnace and to be thereafter retracted to a position above the path of travel of said spindles, means for rotating said ram to cause said gathering mold to follow said spindle a short distance and means for thereafter rotating said ram back to its normal position.

12. In a machine for gathering blanks from a furnace, the combination of a rotatable carrier supporting a series of blowing spindles, a ram supporting a blank gathering mold, means for rotating said carrier to present said spindles successively to said ram, means for reciprocating said ram to cause said gathering mold to enter an opening in said furnace and to be thereafter retracted to a position above the path of travel of said spindles, coacting means carried by said ram and carrier whereby the former is rotated by the latter a short distance during the delivery of a blank to a spindle and air controlled means for thereafter returning the said ram to its normal position.

In witness whereof, we have hereunto set our hands this 6th day of July, 1927.

CARL A. BROWN.
FRANK B. VAN SICKLE.
CHARLES W. CRAIG.